Patented Apr. 7, 1942

2,278,996

UNITED STATES PATENT OFFICE 2,278,996

2-METHOXY-5-AMINOBENZYL ALCOHOL

David X. Klein, Wilmington, Del., assignor to E. I. du Pont de Nemours & Company, Wilmington, Del., a corporation of Delaware No Drawing. Application October 24, 1940, Serial No. 362,623

1 Claim. (Cl. 260—575)

This invention relates to the preparation of a new intermediate for use in the preparation of dyestuffs, and more particularly to 5-amino-2-methoxybenzyl alcohol which has been found to be especially suitable for use in the preparation of acid wool dyestuffs and cellulose acetate dyes of the anthraquinone series. It also finds use in the preparation of azo dyestuffs.

In the preparation of acid wool dyestuffs of the anthraquinone series a hydroxy or amino substituted halogenanthraquinone is frequently condensed with an arylamine to give the corresponding arylaminoanthraquinone and the dyeing characteristics of such colors are determined by the character or molecular constitution of the arylamine employed. Where the dyestuff is prepared from bromamine acid (1-amino-4-bromo-2-anthraquinone sulfonic acid) the dyeing characteristics of the color can be varied widely, depending upon the substituents in the aryl ring. I have found that by introducing the methoxy group in the 4-position and the methylol group in the 3-position of the aniline molecule an arylamine is obtained which when condensed with halogen anthraquinones produces very desirable acid wool dyestuffs of the anthraquinone series. Dyes for cellulose acetate silk may also be obtained in the same manner where the molecule does not contain the sulfonic acid group, or where it is eliminated by known processes.

This new compound which is the 5-amino-2-methoxybenzyl alcohol of the formula

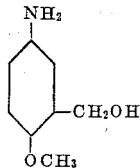

can be prepared from para-nitro-anisole by first condensing it in hydrochloric acid with formaldehyde, hydrolyzing the resulting chloromethyl derivative to the methylol derivative and then reducing the nitro group to the amine.

The following example is given to illustrate a preferred method for preparing this new compound.

Example 306 parts of para-nitro-anisole are added to a solution of 225 parts of 40% formaldehyde and 165 parts of zinc chloride. Hydrochloric acid gas is passed into the suspension under agitation, resulting in a temperature rise to 55° C. The temperature is then raised to 80–90° C. and held for 1½ hours or until saturated with HCl and then it is heated for an additional ½ hour at this temperature. The mass is then diluted with 200 parts of water, cooled under agitation and filtered. On recrystallization from alcohol the 4-methoxy-3-chloromethyl nitrobenzene which is obtained as yellow crystals has a melting point of 72.7° C. 182 parts of the 4-methoxy-3-chloromethyl nitrobenzene are refluxed for 24 hours in 1000 parts of water and 1000 parts of ethyl alcohol containing 136 parts of sodium acetate crystals and 60 parts of sodium carbonate. The mass is then cooled and filtered. The alcohol is distilled from the filtrate and the 2-methoxy-5-nitrobenzyl alcohol is obtained by filtration and drying. On recrystallization from benzene this product has a melting point of 122.3° C.

300 parts of the 2-methoxy-5-nitrobenzyl alcohol are charged into a steel autoclave, provided with an agitator, with 750 parts of methyl alcohol and 25 parts of active nickel catalyst. The charge is heated to 95°–100° C. and hydrogen is admitted to develop from 400 to 500 pounds per square inch pressure while agitating. The admission of hydrogen is continued until no more is absorbed as shown by the pressure remaining constant. The autoclave is cooled, and washed out with 100 cc. methyl alcohol. The catalyst is filtered off, and washed with 100 cc. methyl alcohol. The filtrate is heated with steam to distill off the methyl alcohol. The residual oil solidifies on cooling under agitation. On distilling the 2-methoxy-5-aminobenzyl alcohol at 180° C. under 4 mm. pressure, it is obtained with a melting point of 114–115° C.

The 2-methoxy-5-nitrobenzyl alcohol may be reduced to the corresponding amine by any of the methods normally employed for reducing nitro compounds of the benzene series to the corresponding amines. It is also understood that the hydrogenation method as above described may be varied within wide limits and any other hydrogenation catalyst may be employed. Methyl alcohol, ethyl alcohol, water or mixtures of these may be employed as the hydrogenation medium.

When this intermediate is condensed with 1-amino-4-bromo-2-anthraquinone sulfonic acid an acid wool dyestuff is obtained which dyes wool in desirable greenish-blue shades of very desirable brightness and strength and good leveling properties. On desulfonation of this acid wool dyestuff a dye is obtained which dyes cellulose acetate in similar shades. The 2-methoxy-5-aminobenzyl alcohol may also be condensed with other halogen or hydroxy anthraquinone compounds of the anthraquinone series to prepare a variety of cellulose acetate colors.

I claim:

2-methoxy-5-aminobenzyl alcohol.

DAVID X. KLEIN.